(12) United States Patent
Lee et al.

(10) Patent No.: US 11,055,238 B2
(45) Date of Patent: Jul. 6, 2021

(54) ELECTRONIC DEVICE AND METHOD FOR RECOGNIZING ACCESSORIES

(71) Applicant: Samsung Electronics Co., Ltd., Suwon-si (KR)

(72) Inventors: Won-Wook Lee, Hwaseong-si (KR); Ji-Su Ryu, Yongin-si (KR); Seok-Joon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 16/272,380

(22) Filed: Feb. 11, 2019

(65) Prior Publication Data

US 2019/0171586 A1 Jun. 6, 2019

Related U.S. Application Data

(63) Continuation of application No. 15/662,947, filed on Jul. 28, 2017, now Pat. No. 10,204,062.

(30) Foreign Application Priority Data

Aug. 1, 2016 (KR) .................. 10-2016-0097953

(51) Int. Cl.
  *G06F 13/10* (2006.01)
  *H04M 1/02* (2006.01)
  (Continued)

(52) U.S. Cl.
  CPC .............. *G06F 13/10* (2013.01); *G06F 21/44* (2013.01); *G06F 21/85* (2013.01);
  (Continued)

(58) Field of Classification Search
  CPC ............ H01R 13/6625; H01R 13/6594; H01R 13/719; H01R 13/6666; Y10T 29/49117;
  (Continued)

(56) References Cited

U.S. PATENT DOCUMENTS 7,156,699 B1 * 1/2007 Liu .................... H01R 13/6625
  439/607.55
7,963,801 B1 * 6/2011 Shaw .................. H01R 13/719
  439/620.13
(Continued)

FOREIGN PATENT DOCUMENTS

| EP | 1 659 474 A1 | 5/2006 |
|---|---|---|
| KR | 10-2015-0005030 A | 1/2015 |
| WO | 2016/036952 A1 | 3/2016 |

OTHER PUBLICATIONS

"TPD6S300 USB Type-C Port Protector: Short-to-Vbus Overvoltage and IEC ESD Protection", Jan. 2017, Texas Instruments.*
(Continued)

*Primary Examiner* — Faisal M Zaman
(74) *Attorney, Agent, or Firm* — Jefferson IP Law, LLP

(57) ABSTRACT

An electronic device and a method for recognizing accessories that are mounted into a connector of an electronic device are provided. The electronic device includes a housing that includes a first surface that faces in the first direction and a second surface that faces in the second direction, opposite the first direction, a display that is disposed between the first surface and the second surface and is exposed through the first surface, a power supply unit that applies a voltage, and at least one processor that is electrically connected to the display, wherein: the housing includes a universal serial bus (USB) type-C connector, the connector includes a contact substrate that is electrically connected to the processor to detect the insertion of an accessory, and the power supply unit and the processor are electrically connected to a mid plate that is formed in the contact substrate.

21 Claims, 10 Drawing Sheets

(51) Int. Cl.
*G06F 21/44* (2013.01)
*G06F 21/85* (2013.01)
*H01R 13/66* (2006.01)
*H04M 1/72409* (2021.01)

(52) U.S. Cl.
CPC ...... *H01R 13/6683* (2013.01); *H04M 1/0274* (2013.01); *H04M 1/72409* (2021.01)

(58) Field of Classification Search
CPC . G06F 1/18; G06F 1/28; G06F 1/3215; G06F 3/00
USPC ............. 439/620.09, 620.1; 713/340; 710/62
See application file for complete search history.

(56) References Cited

U.S. PATENT DOCUMENTS

| | | | |
|---|---|---|---|
| 8,154,245 B2 | 4/2012 | Veselic | |
| 8,773,271 B1* | 7/2014 | Stevens | G08B 21/20 340/604 |
| 8,947,883 B2 | 2/2015 | Upadhyayula et al. | |
| 2004/0201936 A1* | 10/2004 | Ju | H02H 11/005 361/93.1 |
| 2004/0217951 A1 | 11/2004 | An | |
| 2007/0186119 A1* | 8/2007 | Yu | G06F 1/189 713/300 |
| 2008/0151513 A1* | 6/2008 | Parchesky | H05K 1/0239 361/760 |
| 2008/0258674 A1* | 10/2008 | Hui | H02J 7/0044 320/101 |
| 2009/0179661 A1 | 7/2009 | Ahsan et al. | |
| 2010/0020452 A1 | 1/2010 | Gandolfi | |
| 2010/0321304 A1* | 12/2010 | Rofougaran | G06F 3/0412 345/173 |
| 2010/0328087 A1 | 12/2010 | Kanno et al. | |
| 2011/0016494 A1 | 1/2011 | Linhardt | |
| 2011/0028037 A1* | 2/2011 | Felislda De La Cruz | H01R 13/6594 439/607.28 |
| 2011/0095722 A1 | 4/2011 | Chang | |
| 2012/0249119 A1 | 10/2012 | Wada et al. | |
| 2013/0169063 A1* | 7/2013 | Yang | H01R 13/719 307/105 |
| 2013/0314296 A1* | 11/2013 | Xu | H05K 1/0227 343/882 |
| 2014/0210675 A1 | 7/2014 | Hwang et al. | |
| 2014/0247015 A1 | 9/2014 | Hsu et al. | |
| 2014/0325201 A1 | 10/2014 | Nam | |
| 2014/0344962 A1* | 11/2014 | Parekh | H02H 5/083 726/36 |
| 2015/0008749 A1 | 1/2015 | Rhee | |
| 2015/0293514 A1 | 10/2015 | Tupala | |
| 2015/0293614 A1 | 10/2015 | Kwak | |
| 2016/0062935 A1 | 3/2016 | Talmola | |
| 2016/0064780 A1 | 3/2016 | Jarvis et al. | |
| 2016/0156137 A1* | 6/2016 | Pan | G06F 13/385 439/78 |
| 2016/0204540 A1* | 7/2016 | Chen | H01R 24/70 439/660 |
| 2016/0275031 A1* | 9/2016 | Lee | G06F 13/20 |
| 2016/0322759 A1 | 11/2016 | Park et al. | |
| 2017/0039155 A1 | 2/2017 | Feng et al. | |
| 2017/0110835 A1* | 4/2017 | Hasegawa | G01R 19/16528 |
| 2017/0269141 A1 | 9/2017 | Sporck et al. | |
| 2017/0344098 A1 | 11/2017 | Abu Hilal | |
| 2017/0344508 A1 | 11/2017 | Setiawan et al. | |
| 2020/0328501 A1* | 10/2020 | Kang | H01Q 9/42 |

OTHER PUBLICATIONS

"LTC4088 High Efficiency Battery Charger/USB Power Manager", 2007, LT0512 Rev B, Linear Technology.*
"TPS25740, TPS25740A USB Type-C and USB PD Source Controller", Jun. 2017, Texas Instruments.*
"AN0046: USB Hardware Design Guidelines", Jun. 2020, Silicon Labs, Rev. 1.02.*
Extended European Search Report dated Oct. 9, 2020, issued in European Patent Application No. 20179730.5.

* cited by examiner

ELECTRONIC DEVICE AND METHOD FOR RECOGNIZING ACCESSORIES

CROSS-REFERENCE TO RELATED APPLICATION(S)

This application is a continuation application of prior application Ser. No. 15/662,947, filed on Jul. 28, 2017, which claimed the benefit under 35 U.S.C. § 119(a) of a Korean patent application filed on Aug. 1, 2016 in the Korean Intellectual Property Office and assigned Serial number 10-2016-0097953, the entire disclosure of which is hereby incorporated by reference.

TECHNICAL FIELD

The present disclosure relates to an electronic device. More particularly, the present disclosure relates to an electronic device and a method for recognizing accessories that are mounted into a connector of an electronic device.

BACKGROUND

Recently, the range of services and additional functions provided by electronic devices has been gradually expanded. Communication service providers or electronic device manufactures are providing a greater variety of functions in order to improve the effective value of the electronic device and in order to meet the various desires of users, and are competitively developing electronic devices in order to differentiate their own products from those of others.

With the development of electronic device technology, in recent years, a data service has been widely provided, in which the electronic device is connected with computers, external devices, or the like through wires to then transmit/receive data. In addition, the wire may be electrically connected to a charger for charging an electric source of the electronic device. More specifically, the connector of the electronic device may be defined as a type C universal serial bus (USB) connector. Such a connector may be used to charge wireless terminals or may be used for the input/output of data thereof. Such a connector may be comprised of a socket to be mounted on the electronic device and a plug connector to be connected with a wire.

The above information is presented as background information only to assist with an understanding of the present disclosure. No determination has been made, and no assertion is made, as to whether any of the above might be applicable as prior art with regard to the present disclosure.

SUMMARY

The prior art has a problem in which an accessory cannot be clearly recognized when foreign matter is inserted into the connector of the electronic device or when the connector of the electronic device is damaged. In addition, the electronic device of the related art cannot determine in advance whether an accessory that uses universal serial bus (USB) type-C has been inserted or foreign matter has been inserted. Furthermore, the electronic device of the related art has a problem in that heat is generated from the electronic device because of overcurrent caused by the inserted foreign matter.

Accordingly, it is required to clearly recognize the insertion of an accessory and to provide a user with information about the presence of foreign matter to secure a safer use of the electronic device.

Aspects of the present disclosure are to address at least the above-mentioned problems and/or disadvantages and to provide at least the advantages described below. Accordingly, an aspect of the present disclosure is to provide an electronic device and method for recognizing an accessory that is mounted into a connector of an electronic device.

In accordance with an aspect of the present disclosure, an electronic device is provided. The electronic device includes a housing that includes a first surface that faces in a first direction and a second surface that faces in a second direction, which is opposite the first direction, a display that is disposed between the first surface and the second surface, and exposed through the first surface, a power supply that applies a voltage, and at least one processor that is electrically connected to the display, wherein the housing includes a universal serial bus (USB) type connector. The connector includes a contact substrate that is electrically connected to the processor to detect the insertion of an accessory, and the power supply unit and the at least one processor are electrically connected to a mid plate that is formed in the contact substrate, and The at least one processor is configured to determine whether the accessory is inserted by using the mid plate, and determine the insertion state of the accessory based on a portion of the voltage applied to the mid plate by the power supply.

In accordance with another aspect of the present disclosure, a method for recognizing an accessory of an electronic device is provided. The method includes applying power to a mid plate in a connector that is formed on a housing of the electronic device, detecting the insertion of an accessory into the connector, determining whether the accessory is inserted by using the mid plate. The mid plate being formed in a contact substrate in the connector, and determining the insertion state of the accessory based on a portion of the voltage applied to the mid plate.

In accordance with another aspect of the present disclosure, a computer-readable storage medium that stores a program including instructions for recognizing an accessory of an electronic device is provided. The instructions includes a first set of instructions for applying power to a mid plate in a connector that is formed on a housing of the electronic device, a second set of instructions for detecting the insertion of an accessory into the connector, a third set of instructions for determining whether the accessory is inserted by using the mid plate that is formed in a contact substrate in the connector, and a fourth set of instructions for determining the insertion state of the accessory based on a portion of the voltage applied to the mid plate.

According to various embodiments of the present disclosure, it is possible to prevent a malfunction of the electronic device or to prevent heat generation due to overcurrent, which is caused by improper mounting of accessories or by the insertion of foreign matter, by providing an electronic device and method for recognizing an accessory that is mounted into a connector of an electronic device.

Further, more rapid restoration can be made by informing the user of the improper mounting of accessories and of the insertion of foreign matter.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
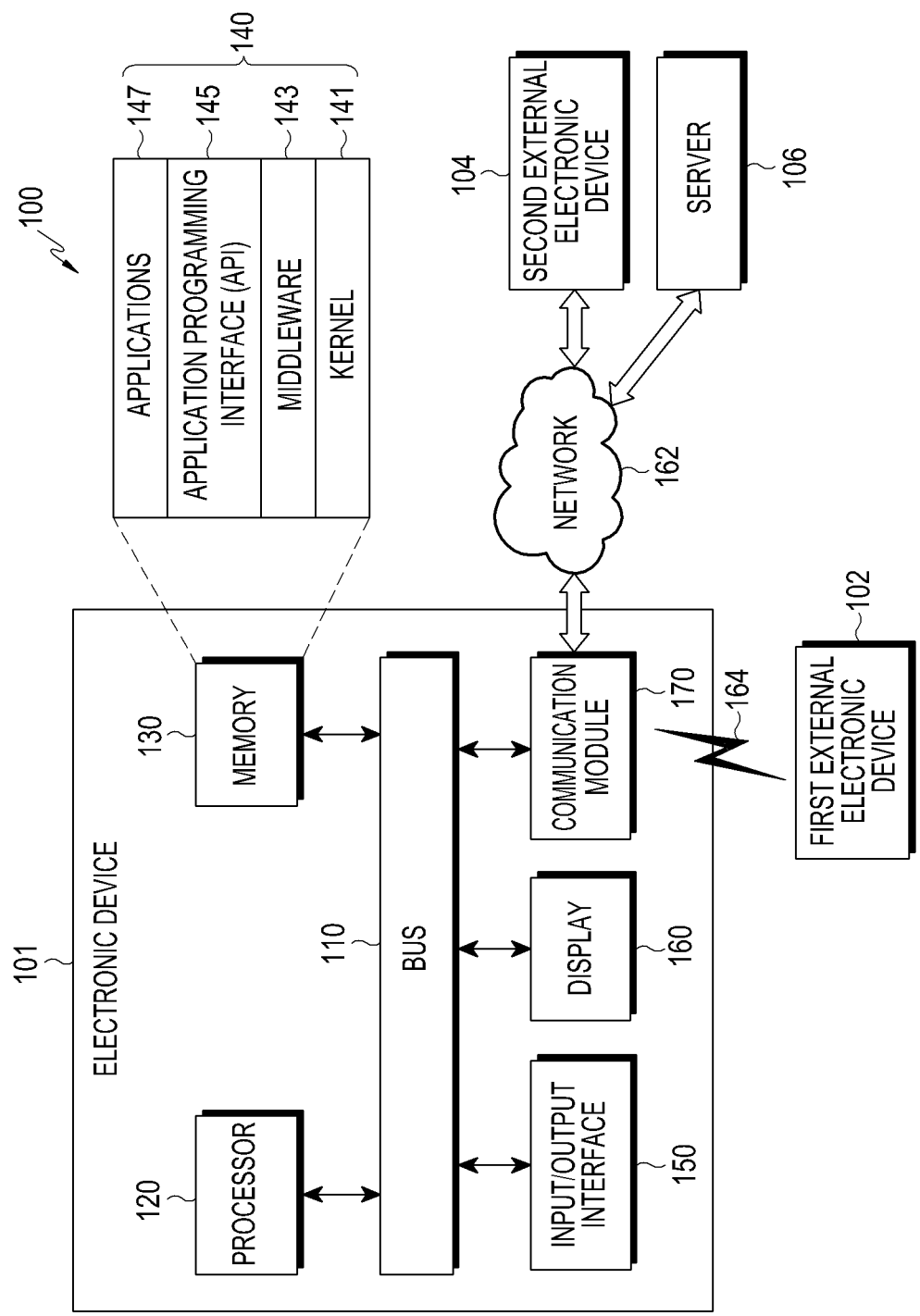
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A and/or B", or "one or more of A and/or B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 in a network environment 100 according to various embodiments of the present disclosure.

Referring to FIG. 1, the electronic device 101 may include a bus 110, a processor 120, a memory 130, an input/output interface 150, a display 160, and a communication interface 170. In some embodiments, the electronic device 101 may exclude one or more components, or other components may be added thereto.

The bus 110, for example, may include a circuit for connecting the components 110 to 170 with each other and for transferring communication data (e.g., control messages and/or data) between the components.

The processor 120 (e.g., at least one processor) may include at least one of a central processing unit (CPU), an application processor (AP), or a communication processor (CP). The processor 120, for example, may process calculations or data related to the control and/or communication of one or more other components of the electronic device 101.

The memory 130 may include a volatile memory and/or a non-volatile memory. For example, the memory 130 may store instructions or data in relation to one or more other components of the electronic device 101. According to an embodiment, the memory 130 may store software and/or programs 140. For example, the programs 140 may include a kernel 141, middleware 143, an application programming interface (API) 145, and/or application programs (or "applications") 147. At least some of the kernel 141, the middleware 143, or the API 145 may be referred to as an operating system (OS).

The kernel 141, for example, may control or manage system resources (e.g., the bus 110, the processor 120, or the memory 130) that are used to execute the operations or functions that are implemented in other programs (e.g., the middleware 143, the API 145, or the application programs 147). In addition, the kernel 141 may provide an interface by which the middleware 143, the API 145, or the application programs 147 may access each component of the electronic device 101 to then control or manage the system resources.

The middleware 143, for example, may play an intermediate role between the API 145 or the application programs 147 and the kernel 141 to communicate with each other for the transmission and reception of data.

In addition, the middleware 143 may process one or more operation requests that are received from the application programs 147 according to the priority. For example, the middleware 143 may give priority for using the system resources (e.g., the bus 110, the processor 120, or the memory 130) of the electronic device 101 to at least one of the application programs 147. For example, the middleware 143 may perform scheduling or load balancing for one or more operation requests by processing the same according to the priority given to at least one of the application programs 147.

The API 145, for example, may be an interface by which the application programs 147 control functions that are provided by the kernel 141 or the middleware 143, and, for example, may include one or more interfaces or functions (e.g., instructions) for file control, window control, image processing, or text control.

The input/output interface 150, for example, may play the role of an interface that transfers instructions or data received from a user or other external devices to other components of the electronic device 101. In addition, the input/output interface 150 may output instructions or data received from other components of the electronic device 101 to the user or other external devices.

The display 160, for example, may include a liquid crystal display (LCD), a light-emitting diode (LED) display, an organic LED (OLED) display, a microelectromechanical system (MEMS) display, or an electronic paper display. For example, the display 160 may display a variety of content (e.g., text, images, videos, icons, symbols, or the like) to the user. The display 160 may include a touch screen, and, for example, may receive a touch input, a gesture input, a proximity input, or a hovering input by using electronic pens or a user's body part.

The communication interface 170, for example, may establish communication between the electronic device 101 and external devices (e.g., the first external electronic device 102, the second external electronic device 104, or a server 106). For example, the communication interface 170 may be connected to the network 162 through wireless communication or wired communication in order to thereby communicate with external devices (e.g., the second external electronic device 104 or the server 106).

For example, the wireless communication may use, as a cellular communication protocol, at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like. In addition, the wireless communication, for example, may include short-range communication 164. The short-range communication 164, for example, may include at least one of Wi-Fi, Bluetooth, near field communication (NFC), or a global navigation satellite system (GNSS). The GNSS, for example, may include at least one of a GPS, a global navigation satellite system (GLONASS), the Beidou navigation satellite system (hereinafter, "Beidou"), Galileo, or the European global satellite-based navigation system according to the usage area or bandwidth. Hereinafter, "GPS" may be interchangeably used with "GNSS" in the present specification. For example, the wired communication may include at least one of a universal serial bus (USB), a high definition multimedia interface (HDMI), recommended standard 232 (RS-232), or a plain old telephone service (POTS). The network 162 may include one or more telecommunication networks, such as a computer network (e.g., local area network (LAN) or wide area network (WAN)), the Internet, or a telephone network.

Each of the first external electronic device 102 and the second external electronic device 104 may be of a type the same as, or different from, that of the electronic device 101. According to an embodiment, the server 106 may include a group of one or more servers. According to various embodiments, all or some of the operations that are executed in the electronic device 101 may be executed by one or more other electronic devices (e.g., the external electronic devices 102 or 104, or the server 106). According to an embodiment, in the case where the electronic device 101 executes a specific function or service automatically or upon request, the electronic device 101 may make a request to other devices (e.g., the external electronic devices 102 or 104, or the server 106) for at least some of the functions related to the function or service additionally or instead of executing the same by itself. The other electronic devices (e.g., the external electronic devices 102 or 104, or the server 106) may execute the requested function or additional function, and may transfer the result thereof to the electronic device 101. The electronic device 101 may provide the requested function or service by directly providing the received result or by additionally processing the same. To this end, for example, cloud computing, distributed computing, or client-server computing technology may be used.

Figure 2:
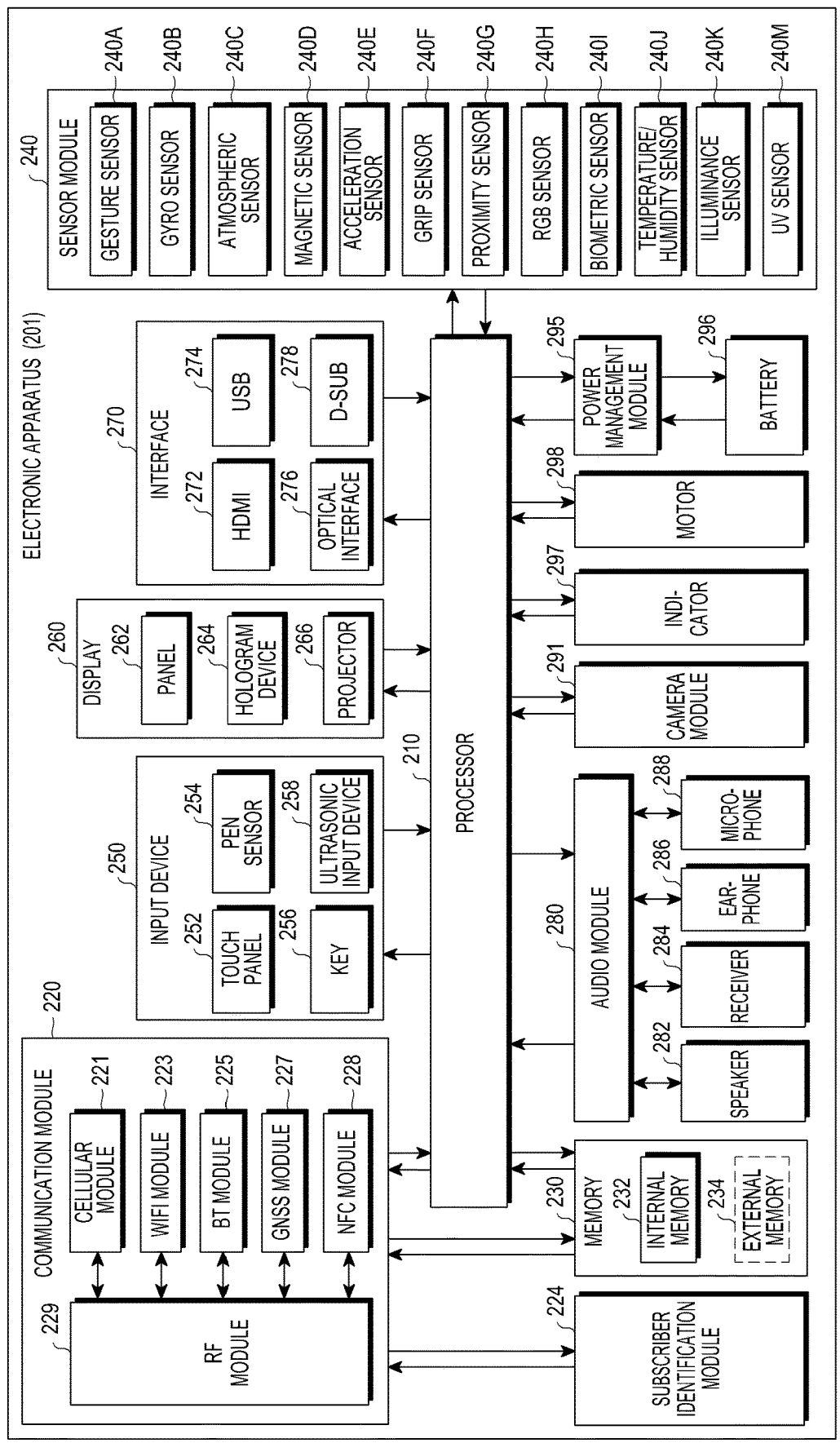
FIG. 2 is a block diagram of an electronic device according to various embodiments of the present disclosure.

FIG. 2 is a block diagram of an electronic device 201 according to various embodiments of the present disclosure.

Referring to FIG. 2, the electronic device 201, for example, may include all or some of the components of the electronic device 101 shown in FIG. 1. The electronic device 201 may include one or more processors (e.g., application processors (AP)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, or a motor 298.

The processor 210, for example, may control a multitude of hardware or software components that are connected with the processor 210, and may perform processing of various pieces of data and calculations by executing an OS or application programs. The processor 210 may be implemented by, for example, a system on chip (SoC). According to an embodiment, the processor 210 may further include a graphic processing unit (GPU) and/or an image signal processor (ISP). The processor 210 may include at least some (e.g., a cellular module 221) of the components shown in FIG. 2. The processor 210 may load instructions or data received from one or more other components (e.g., a non-volatile memory) into a volatile memory to then process the same, and may store a variety of data in a non-volatile memory.

The communication module 220 may have a configuration the same as or similar to that of the communication interface 170 of FIG. 1. The communication module 220, for example, may include a cellular module 221, a Wi-Fi module 223, a Bluetooth module 225, a GNSS module 227 (e.g., a GPS module, a Glonass module, the Beidou module, or the Galileo module), an NFC module 228, or a radio frequency (RF) module 229.

The cellular module 221, for example, may provide services of voice calls, video calls, text messaging, or the Internet over communication networks. According to an embodiment, the cellular module 221 may perform identification and verification of the electronic device 201 in the communication network by using the subscriber identification module (e.g., a SIM card) 224. According to an embodiment, the cellular module 221 may perform at least some of the functions provided by the processor 210. According to an embodiment, the cellular module 221 may include a communication processor (CP).

For example, each of the Wi-Fi module 223, the Bluetooth module 225, the GNSS module 227, or the NFC module 228 may include a processor for processing data that is transmitted and received through the corresponding module. According to some embodiments, at least some (e.g., two or more) of the cellular module 221, the Wi-Fi module 223, the Bluetooth module 225, the GNSS module 227, or the NFC module 228 may be included in one integrated chip (IC) or one IC package.

The RF module 229, for example, may transmit and receive communication signals (e.g., RF signals). The RF module 229, for example, may include a transceiver, a power amp module (PAM), a frequency filter, a low noise amplifier (LNA), antennas, or the like. According to another embodiment, at least one of the cellular module 221, the Wi-Fi module 223, the Bluetooth module 225, the GNSS module 227, or the NFC module 228 may transmit and receive RF signals through a separated RF module.

The subscriber identification module (SIM) 224, for example, may include a card that adopts a SIM and/or an embedded SIM, and may include inherent identification information (e.g., an integrated circuit card identifier (IC- CID)) or subscriber information (e.g., an international mobile subscriber identity (IMSI)).

The memory 230 (e.g., the memory 130), for example, may include an internal memory 232 or an external memory 234. The internal memory 232, for example, may include at least one of volatile memories (e.g., a dynamic random access memory (DRAM), a static RAM (SRAM), a synchronous DRAM (SDRAM), or the like) or non-volatile memories (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, a solid state drive (SSD), or the like).

The external memory 234 may further include a flash drive, for example, compact flash (CF), secure digital (SD), micro-SD, mini-SD, extreme digital (xD), a multi-media card (MMC), a memory stick, or the like. The external memory 234 may be functionally and/or physically connected with the electronic device 201 through various interfaces.

The sensor module 240, for example, may measure physical quantities or may detect the operation state of the electronic device 201 to then convert the measured or detected information into electric signals. The sensor module 240, for example, may include at least one of a gesture sensor 240A, a gyro-sensor 240B, an atmospheric sensor 240C, a magnetic sensor 240D, an acceleration sensor 240E, a grip sensor 240F, a proximity sensor 240G, a color sensor 240H (e.g., a red-green-blue (RGB) sensor), a biometric sensor 240I, a temperature/humidity sensor 240J, an illuminance sensor 240K, or an ultraviolet (UV) sensor 240M. Alternatively or additionally, the sensor module 240, for example, may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors that are included therein. In some embodiments, the electronic device 201 may further include a processor, as a part of the processor 210 or separately from the processor 210, which is configured to control the sensor module 240, in order to thereby control the sensor module 240 while the processor 210 is in a sleep mode.

The input device 250, for example, may include a touch panel 252, a (digital) pen sensor 254, keys 256, or an ultrasonic input device 258. The touch panel 252, for example, may use at least one of a capacitive type, a pressure-sensitive type, an infrared type, or an ultrasonic type. In addition, the touch panel 252 may further include a control circuit. The touch panel 252 may further include a tactile layer in order to thereby provide a user with a tactile reaction.

For example, the (digital) pen sensor 254 may be a part of the touch panel, or may include a separate recognition sheet. The keys 256 may include, for example, physical buttons, optical keys, or a keypad. The ultrasonic input device 258 may detect an ultrasonic wave generated in an input tool through a microphone (e.g., a microphone 288) in order to thereby identify data corresponding to the detected ultrasonic wave.

The display 260 (e.g., the display 160) may include a panel 262, a hologram device 264, and/or a projector 266. The panel 262 may include the same or similar components as the display 160 of FIG. 1. The panel 262, for example, may be implemented to be flexible, transparent, or wearable. The panel 262 may be configured with the touch panel 252 as a single module. The hologram device 264 may display 3D images in the air by using interference of light. The projector 266 may display images by projecting light onto a screen. The screen, for example, may be positioned inside or outside the electronic device 201. According to an embodiment, the display 260 may further include a control circuit for controlling the panel 262, the hologram device 264, or the projector 266.

The interface 270, for example, may include at least one of a high-definition multimedia interface (HDMI) 272, a universal serial bus (UBS) 274, an optical interface 276, or a D-subminiature (D-sub) 278. The interface 270, for example, may be included in the communication interface 170 shown in FIG. 1. Additionally or alternatively, the interface 270, for example, may include a mobile high-definition link (MHL) interface, a secure digital (SD) card/multi-media card (MMC) interface, or an infrared data association (IrDA) standard interface.

The audio module 280, for example, may convert a sound into an electric signal, and vice versa. At least some components of the audio module 280, for example, may be included in the input/output interface 150 shown in FIG. 1. For example, the audio module 280 may process voice information that is input or output through a speaker 282, a receiver 284, earphones 286, or a microphone 288.

For example, the camera module 291 is a device for photographing still and moving images, and, according to an embodiment, the camera module 291 may include one or more image sensors (e.g., a front sensor or a rear sensor), lenses, an image signal processor (ISP), a flash (e.g., an LED or a xenon lamp), or the like.

The power management module 295, for example, may manage the power of the electronic device 201. Although the electronic device 201 may be supplied with power through a battery, it is not limited thereto. According to an embodiment, the power management module 295 may include a power management integrated circuit (PMIC), a charger integrated circuit (IC), or a battery or fuel gauge. The PMIC may be implemented by means of a wired charging type and/or a wireless charging type. The wireless charging type, for example, may encompass a magnetic-resonance type, a magnetic-induction type, or an electromagnetic-wave type, and may further include additional circuits for wireless charging, such as coil loops, resonance circuits, or rectifiers. The battery gauge, for example, may measure the remaining power of the battery 296, a charging voltage, current, or temperature. The battery 296, for example, may include a rechargeable battery and/or a solar battery.

The indicator 297 may display a specific state (for example, a booting state, a message state, or a charging state) of the whole or a part (e.g., the processor 210) of the electronic device 201. The motor 298 may convert an electric signal to a mechanical vibration, and may generate a vibration or a haptic effect. Although it is not shown in the drawing, the electronic device 201 may include a processing device (e.g., a GPU) for supporting mobile TV. The processing device for supporting mobile TV, for example, may process media data according to standards, such as digital multimedia broadcasting (DMB), digital video broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
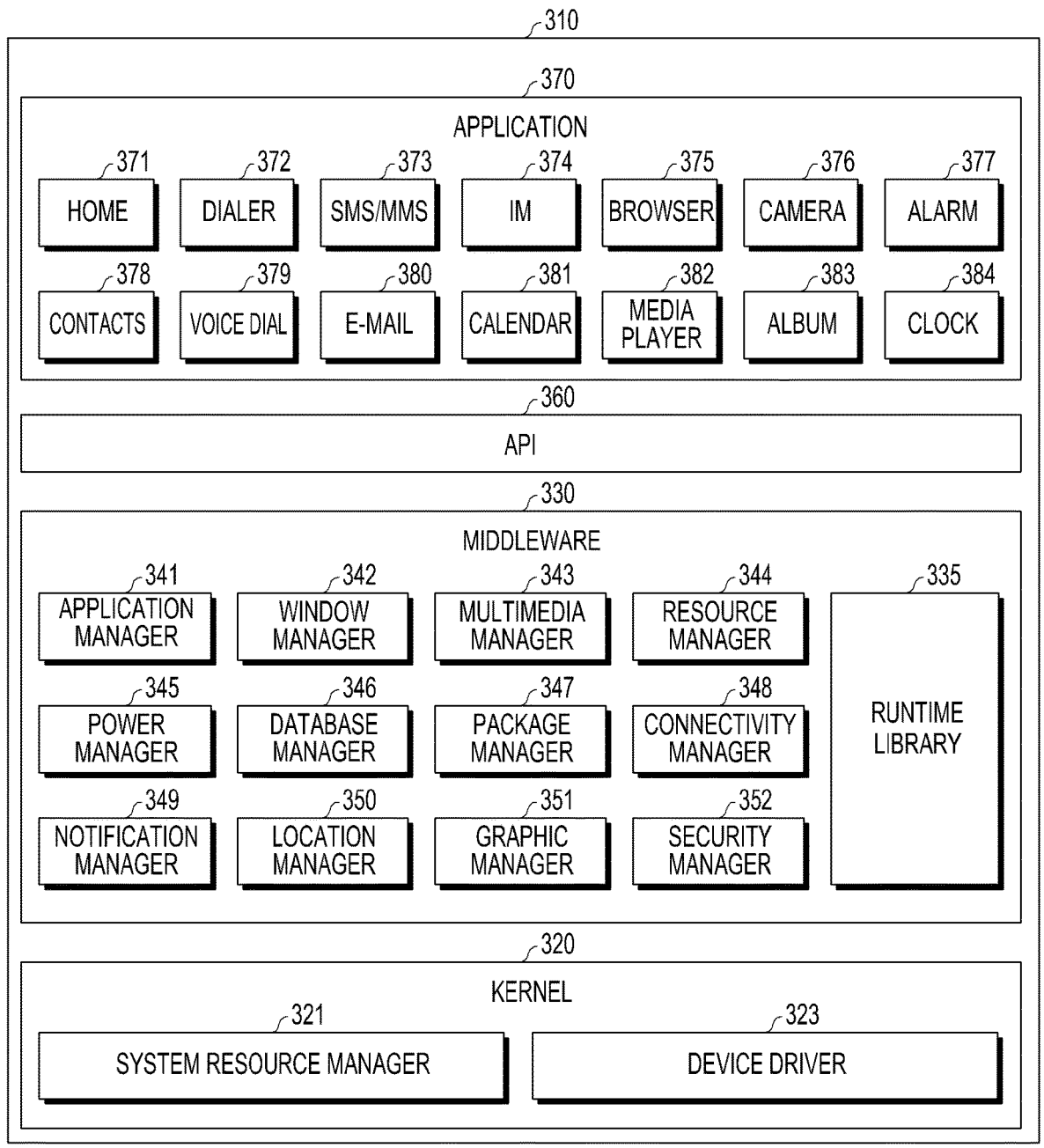
FIG. 3 is a block diagram of a program module according to various embodiments of the present disclosure.

FIG. 3 is a block diagram of a program module according to various embodiments of the present disclosure.

Referring to FIG. 3, according to an embodiment, the program module 310 (e.g., the programs 140) may include an operating system (OS) for controlling resources that are related to an electronic device (e.g., the electronic device 101) and/or various applications (e.g., the application programs 147) that are executed under the OS. For example, the OS may be Android™, iOS™, Windows™ Symbian™, Tizen™, Samsung Bada OS™, or the like.

The program module 310 may include a kernel 320, middleware 330, an application programming interface (API) 360, and/or applications 370. At least some of the program module 310 may be preloaded in the electronic device, or may be downloaded from external electronic devices (e.g., the external electronic devices 102 and 104, or the server 106).

The kernel 320 (e.g., the kernel 141), for example, may include a system resource manager 321 and/or a device driver 323. The system resource manager 321 may perform the control, allocation, or collection of system resources. According to an embodiment, the system resource manager 321 may include a process management unit, a memory management unit, or a file system management unit. The device driver 323, for example, may include a display driver, a camera driver, a Bluetooth (BT) driver, a shared memory driver, a USB driver, a keypad driver, a Wi-Fi driver, an audio driver, or an inter-process communication (IPC) driver.

The middleware 330, for example, may provide functions that are required in common for the applications 370, or may provide the applications 370 with various functions through the API 360 in order to allow the applications 370 to effectively use the limited system resources in the electronic device. According to an embodiment, the middleware 330 (e.g., the middleware 143) may include at least one of a run-time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run-time library 335, for example, may include a library module that a compiler uses in order to add new functions through programming languages while the applications 370 are executed. The run-time library 335 may perform the input/output management, the memory management, or a function of arithmetic calculation.

The application manager 341, for example, may manage a life cycle of at least one of the applications 370. The window manager 342 may manage the GUI resource that is used in the screen. The multimedia manager 343 may recognize formats for reproducing various media files, and may perform encoding or decoding of media files by using a codec corresponding to each format. The resource manager 344 may manage resources, such as a source code of at least one of the applications 370, memories, or storage spaces.

The power manager 345, for example, may manage a battery or power by operating in association with a basic input/output system (BIOS), and may provide power information that is necessary for the operation of the electronic device. The database manager 346 may create, retrieve, or change a database that is to be used in at least one of the applications 370. The package manager 347 may manage the installation or update of the applications that are distributed in the form of a package file.

The connectivity manager 348, for example, may manage a wireless connection, such as Wi-Fi or Bluetooth. The notification manager 349 may display or notify the user of events (such as received messages, appointments, or proximity notifications) without disturbance. The location manager 350 may manage location information of the electronic device. The graphic manager 351 may manage graphic effects to be provided to the user or user interfaces related thereto. The security manager 352 may provide general security functions that are required for the system security or user verification. According to an embodiment, in the case of an electronic device (e.g., the electronic device 101) adopting a phone call function, the middleware 330 may further include a telephony manager for managing functions of a voice call or a video call of the electronic device.

The middleware 330 may include a middleware module that is a combination of various functions of the above-described components. The middleware 330 may provide a module that is specialized according to the type of OS in order to provide differentiated functions. In addition, the middleware 330 may dynamically exclude some of the typical components or add new components.

The API 360 (e.g., the API 145), for example, may be a group of API programming functions, and may be provided with a different configuration according to an OS. For example, one set of APIs may be provided to each platform in the case of Android or iOS, and two or more sets of APIs may be provided to each platform in the case of Tizen.

The applications 370 (e.g., the applications 147), for example, may include one or more applications that can execute functions of home 371, a dialer 372, short message service (SMS)/multimedia messaging service (MMS) 373, instant messages 374, a browser 375, a camera 376, an alarm 377, contacts 378, voice dial 379, e-mail 380, a calendar 381, a media player 382, an album 383, a clock 384, healthcare (e.g., measuring the amount of exercise or blood glucose), providing environment information (e.g., providing atmospheric pressure, humidity, or temperature information), or the like.

According to an embodiment, the applications 370 may include an application (hereinafter, referred to as "information-exchange application" for the convenience of explanation) that supports the exchange of information between the electronic device (e.g., the electronic device 101) and external electronic devices (e.g., the external electronic devices 102 or 104). The information-exchange application, for example, may include a notification relay application for relaying specific information to the external electronic device, or a device management application for managing the external electronic device.

For example, the notification relay application may include a function of transferring notification information that is generated in other applications (e.g., the SMS/MMS application, the e-mail application, the healthcare application, or the environment information application) of the electronic device to the external electronic device (e.g., the external electronic devices 102 or 104). In addition, the notification relay application, for example, may receive notification information from the external electronic device to then provide the same to the user.

The device management application, for example, may manage (e.g., install, delete, or update): one or more functions (e.g., turning on or off the external electronic device (or some components) or adjusting the brightness (or resolution) of a display) of an external electronic device (e.g., the external electronic devices 102 or 104) that communicates with the electronic device; applications that are executed in the external electronic device; or services (e.g., a phone call service or a messaging service) that are provided by the external electronic device.

According to an embodiment, the applications 370 may include applications (e.g., a healthcare application of a mobile medical device) that are designated according to the attribute of the external electronic device (e.g., the external electronic device 102s or 104). According to an embodiment, the applications 370 may include applications that are received from the external electronic device (e.g., the server 106 or the external electronic devices 102 or 104). According to an embodiment, the applications 370 may include preloaded applications or third-party applications that can be downloaded from a server. The names of the components of the program module 310 according to the illustrated embodiment may vary depending on the type of OS.

According to various embodiments, at least some of the program module 310 may be implemented by software, firmware, hardware, or a combination of at least two thereof. At least some of the program modules 310, for example, may be implemented (e.g., executed) by a processor (e.g., the processor 210). At least some of the program module 310, for example, may include modules, programs, routines, sets of instructions, processes, or the like in order to perform one or more functions.

Figure 4:
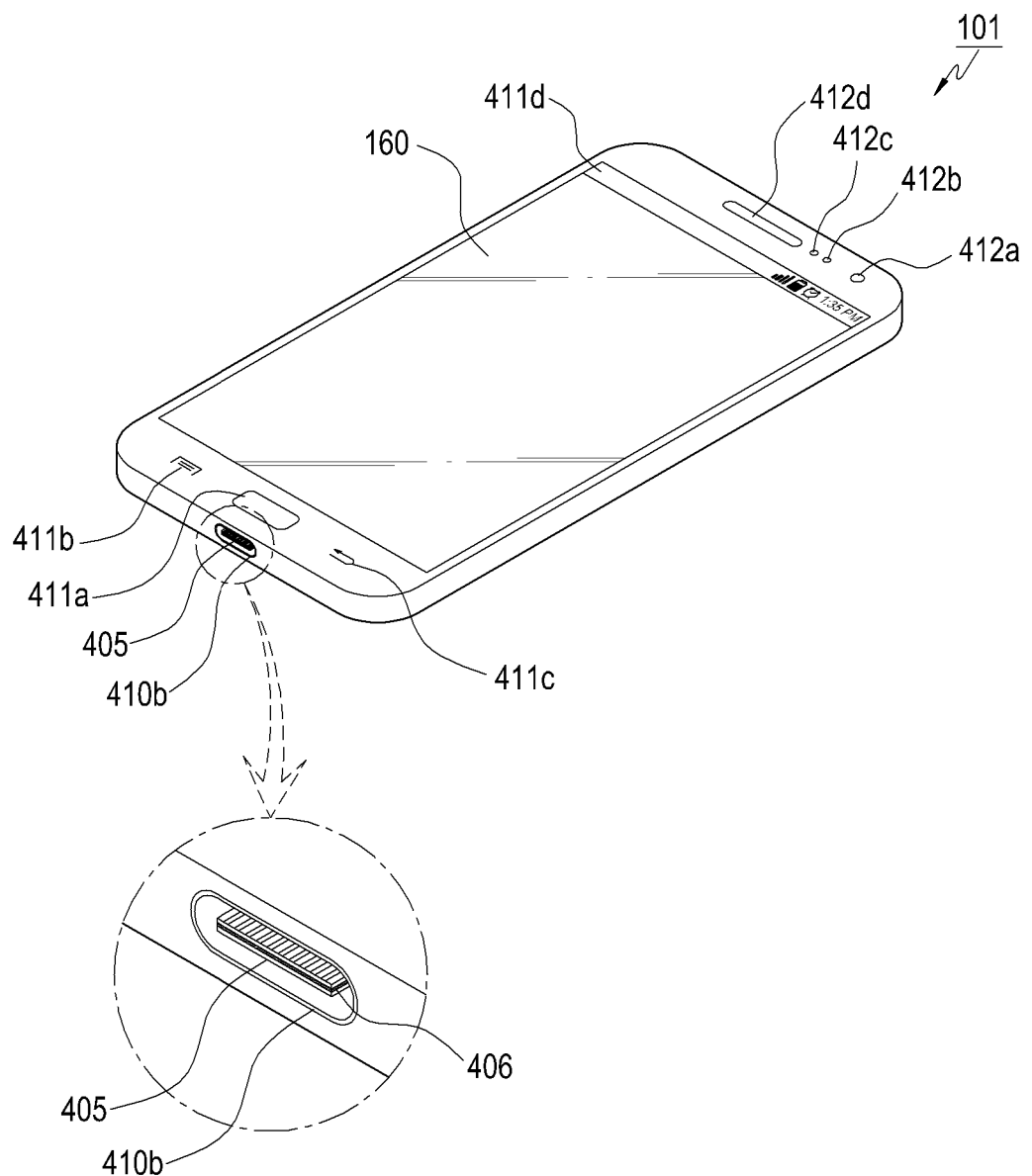
FIG. 4 is a perspective view showing the front side of an electronic device according to various embodiments of the present disclosure.
Figure 5:
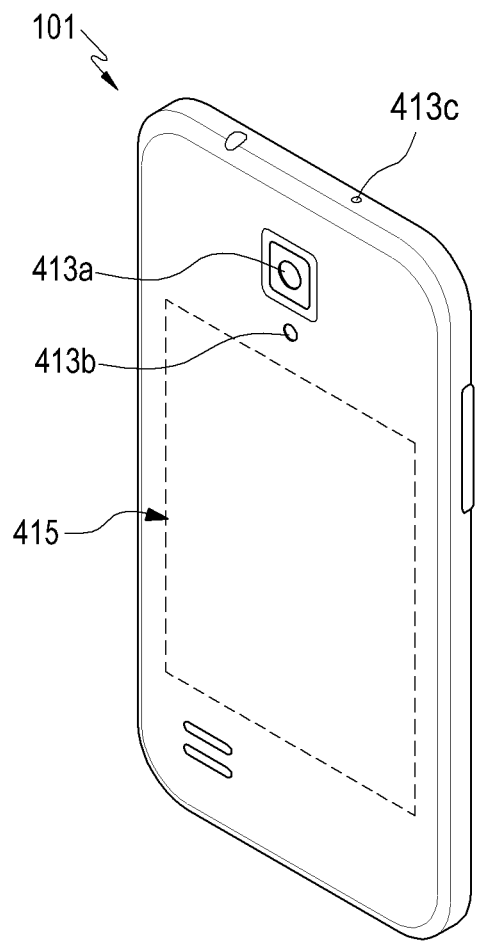
FIG. 5 is a perspective view showing the back side of an electronic device according to various embodiments of the present disclosure.

FIG. 4 is a perspective view showing the front side of an electronic device according to various embodiments of the present disclosure, and FIG. 5 is a perspective view showing the back side of an electronic device according to various embodiments of the present disclosure.

Referring to FIGS. 4 and 5, the electronic device 101, according to various embodiments of the present disclosure, may be a smart phone, a wearable device, a TV set, or a tablet PC that includes a USB type-C connector. A connector 410b of the electronic device 101 may be referred to as a receptacle, and a connector of an accessory that can be connected to the receptacle may be referred to as a plug.

As shown in FIG. 4, a display 160 that is capable of detecting a touch input and a hovering input may be disposed at the center of the front side of the electronic device 101. The display 160 may occupy most of the front side of the electronic device 101. FIG. 4 shows an example in which a main home screen is displayed on the display 160. The main home screen is displayed first on the display 160 when the electronic device 101 is turned on. In the case where the electronic device 101 has several pages of different home screens, the main home screen may be the first home screen, among the several pages of home screens. The home screen may display icons for executing frequently used applications, a main menu switch key, time, weather, or the like. The main menu switch key may display a menu screen on the display 160. In addition, a status bar 411d may be formed at an upper portion of the display 160 in order to display the status, such as the battery charging status, the received signal strength, or the current time. A home key 411a, a menu button 411b, and a back button 411c may be formed at a lower portion of the display 160.

The home key 411a may display a main home screen on the display 160. For example, when the home key 411a is touched while the display 160 displays another home screen that is different from the main home screen or displays a menu screen, the main home screen may be displayed on the display 160. In addition, when the home key 411a is touched while applications are executed on the display 160, the main home screen may be displayed on the display 160. Further, the home key 411a may be used to display, on the display 160, applications that have recently been used, or a task manager. The menu button 411b may provide connected menus that may be used on the display 160. The connected menus may include a widget addition menu, a background screen change menu, a search menu, an edit menu, a setting menu, or the like. The back button 411c may display a screen that was executed immediately before the currently executed screen, or may terminate the most recently used application.

According to various embodiments of the present disclosure, a first camera 412a, an illuminance sensor 412b, a proximity sensor 412c, or a speaker 412d may be included in an upper portion of the front side of the electronic device 101. The electronic device 101 may adopt a connector 410b that can be electrically connected to an external electronic device. The connector 410b may be used as an interface for connecting the electronic device 101 to the first external electronic device 102 or a power source (not shown). The electronic device 101 may transmit or receive data that is stored in the memory 130 of the electronic device 101 to or from the first external electronic device 102 through a wired cable that is connected to the connector 410b under the control of the processor 120. In addition, the electronic device 101 may receive power from a power source (not shown) through a wired cable that is connected to the connector 410b, or may charge a battery (not shown) by using the power source. The connector 410b may include a USB Type-C connector, and may have a contact substrate 405 formed therein. In addition, a mid plate 406 that is electrically conductive may be formed in the contact substrate 405. Furthermore, a plurality of pins may be formed on the upper surface and the lower surface of the contact substrate 405. The electronic device 101 may be connected in a wired manner with the first external electronic device 102 through the connector 410b. In this case, the connector 410b may be shaped so as to allow upward mounting or downward mounting with a terminal of the first external electronic device 102. That is, the terminal of the first external electronic device 102 can be plugged into the connector 410b in either direction. In addition, a plurality of pins formed on the upper surface and the lower surface of the contact substrate 405 may be arranged so as to enable data transmission and reception or power reception regardless of the direction in which the terminal of the first external electronic device 102 is plugged.

As shown in FIG. 5, a second camera 413a, a flash 413b, or a speaker 413c may be provided on the back side of the electronic device 101. If the electronic device 101 is configured to have a detachable battery pack, the bottom surface of the electronic device 101 may be a detachable battery cover 415.

Figure 6:
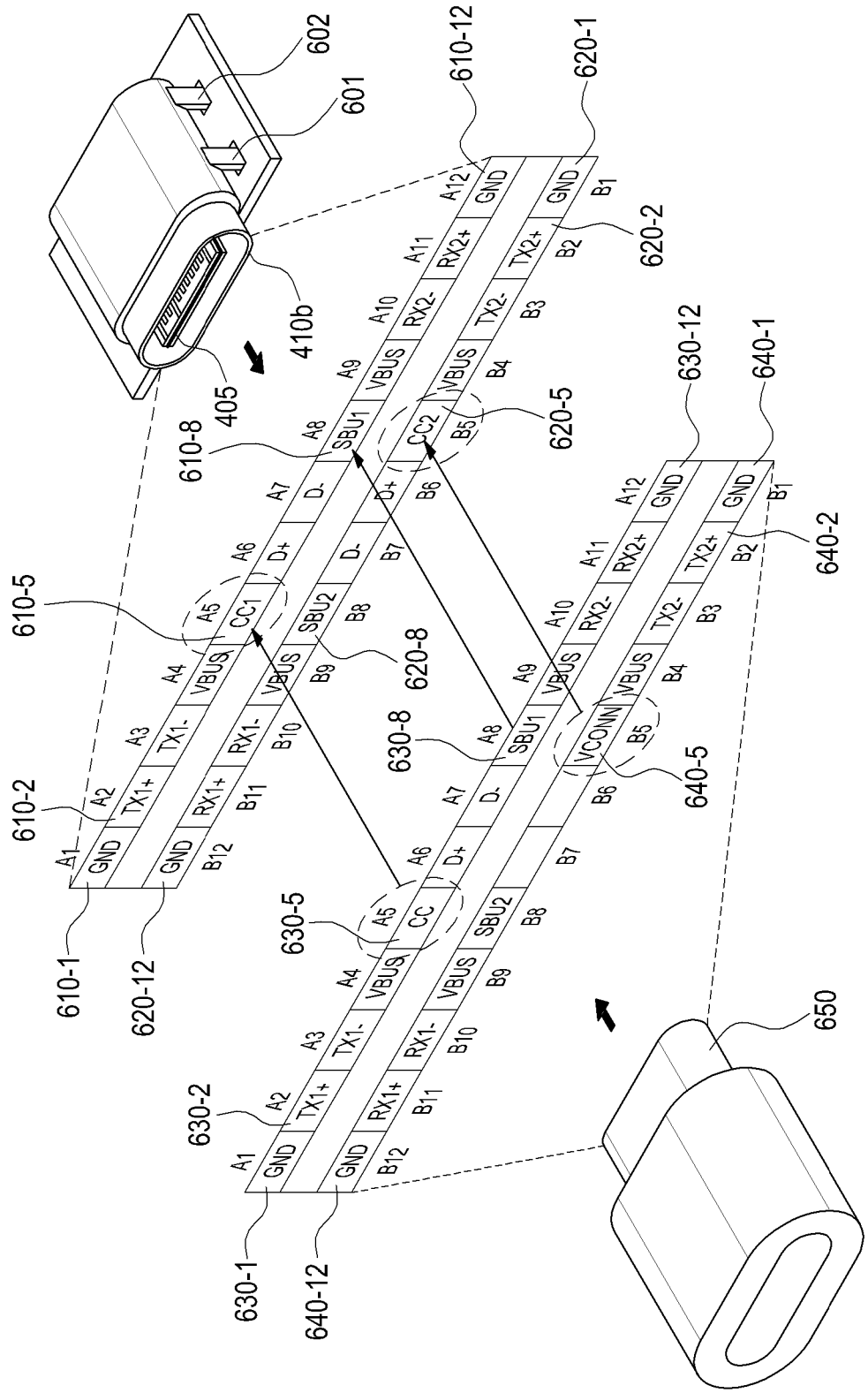
FIG. 6 is a view showing a connector of an electronic device and a terminal of an accessory, and showing various functions of a plurality of pins that are formed on a contact substrate of a connector of an electronic device according to an embodiment of the present disclosure.

FIG. 6 is a view showing the connector 410b of the electronic device 101 and a terminal 650 of an accessory and showing various functions of a plurality of pins that are formed on a contact substrate of the connector of the electronic device according to an embodiment of the present disclosure.

Referring to FIG. 6, the electronic device 101 may be connected to other electronic devices as well as accessories through the connector 410b.

The connector 410b of the electronic device 101 may be shaped such that the terminal 650 of the accessory can be plugged into the same in either direction, and a contact substrate 405 may be formed in the connector 410b. The contact substrate 405 may have twelve pins 610-1 to 610-12 that are formed on the upper surface thereof and twelve pins 620-1 to 620-12 that are formed on the lower surface thereof. A mid plate 406 that is electrically conductive may be formed in the contact substrate 405. In addition, the terminal 650 of the accessory may have twelve pins 630-1 to 630-12 that are formed in the upper portion thereof so as to come into contact with the twelve pins 610-1 to 610-12 that are formed on the upper surface of the contact substrate 405, and may have twelve pins 640-1 to 640-12 that are formed in the lower portion thereof so as to come into contact with the twelve pins 620-1 to 620-12 that are formed on the lower surface of the contact substrate 405. The number of pins that are configured at the terminal of the accessory may vary depending on the type of accessory. In addition, the accessory may adopt one or two configuration channel (CC)-pins depending on the type. For example, the order of arrangement of the twelve pins formed on the upper surface may be the same as that of the twelve pins formed on the lower surface such that the terminal 650 of the accessory can be plugged in either direction. With this structure, the user can plug the cable of the accessory into the connector 410b of the electronic device 101 at a rotation of 180 degrees.

The arrangement of the pins formed on the upper surface and the lower surface of the contact substrate 405 is shown in Table 1 below.

neously used. The pins to be used may be determined according to the connection cable, the terminal that is provided at the end of the cable, and the connection state of the connector 410b of the electronic device 101 with respect to the terminal.

The CC1-pin 610-5 that is formed on the upper surface of the contact substrate 405 and the CC2-pin 620-5 that is formed on the lower surface thereof may be used to recognize the usage of an accessory that is connected to the connector 410b. For example, when the CC1-pin 610-5 of the electronic device 101 is connected to the CC-pin 630-5 of the accessory by plugging the terminal 650 of the accessory into the connector 410b of the electronic device 101 while the upper surface of the terminal 650 faces upward, the CC2-pin 620-5 of the electronic device 101 may be used to supply power to the accessory recognition IC (VCONN). In addition, when the CC2-pin 620-5 of the electronic device 101 is connected to the CC-pin 630-5 of the accessory by plugging the terminal 650 of the accessory into the connector 410b of the electronic device 101 while the upper surface of the terminal 650 faces downward, the CC1-pin 610-5 of the electronic device 101 may be used to supply power to the accessory recognition IC (VCONN). The CC-pins 610-5 and 620-5 of the electronic device 101 may be connected to CC-pin 630-5 and VCONN 640-5, respectively, of the accessory, and the CC-pins 610-5 and 620-5 of the electronic device 101 may support CC and VCONN.

In addition, the SBU1-pin 610-8 and the SBU2-pin 620-8 of the electronic device are low speed signal pins that are

TABLE 1

| Pin | Pin | Name | Function | Note |
| --- | --- | --- | --- | --- |
| A1 | B1 | GND | Power | Support for 60 W minimum (combined with all VBUS pins) |
| A2 | B2 | TX1+ | USB 3.1 or Alternate Mode | 10 Gb/s differential pair with TX1− |
| A3 | B3 | TX1− | USB 3.1 or Alternate Mode | 10 Gb/s differential pair with TX1+ |
| A4 | B4 | VBUS | Power | Support for 60 W minimum (combined with all VBUS pins) |
| A5 | B5 | CC1 | CC or VCONN | — |
| A6 | B6 | D+ | USB 2.0 | — |
| A7 | B7 | D− | USB 2.0 | — |
| A8 | B8 | SBU1 | Alternate Mode | Lower speed side band signal |
| A9 | B9 | VBUS | Power | Support for 60 W minimum (combined with all VBUS pins) |
| A10 | B10 | RX2− | USB 3.1 or Alternate Mode | 10 Gb/s differential pair with RX2+ |
| A11 | B11 | RX2+ | USB 3.1 or Alternate Mode | 10 Gb/s differential pair with RX2− |
| A12 | B12 | GND | Power | Support for 60 W minimum (combined with all VBUS pins) |

Twenty-four pins are formed in USB type-C. The twenty-four pins may be disposed in a mirrored configuration because of the reversibility. With this structure, the user can rotate the terminal 650 of the accessory by 180 degrees to then mount the same into the connector 410b of the electronic device 101. In this case, the symmetrical pins may not be used together. For example, if TX1+ and TX1− are used, TX2+, TX2−, RX2+, and RX2− may not be used, and if RX1+ and RX1− are used, RX2+, RX2−, TX2+, and TX2− may not be used. As described above, the mid plate 406, which is electrically conductive, is included in the contact substrate 405 of the connector 410b. Although there is a total of twenty-four pins (for example, twelve pins on the upper surface and twelve pins on the lower surface) in the contact substrate 405, the corresponding pins may not be simultaallocated to be used in an alternate mode. The negotiation for the alternate mode may be required between the electronic device 101 and the accessory prior to the transmission and reception of power.

Figure 7A:
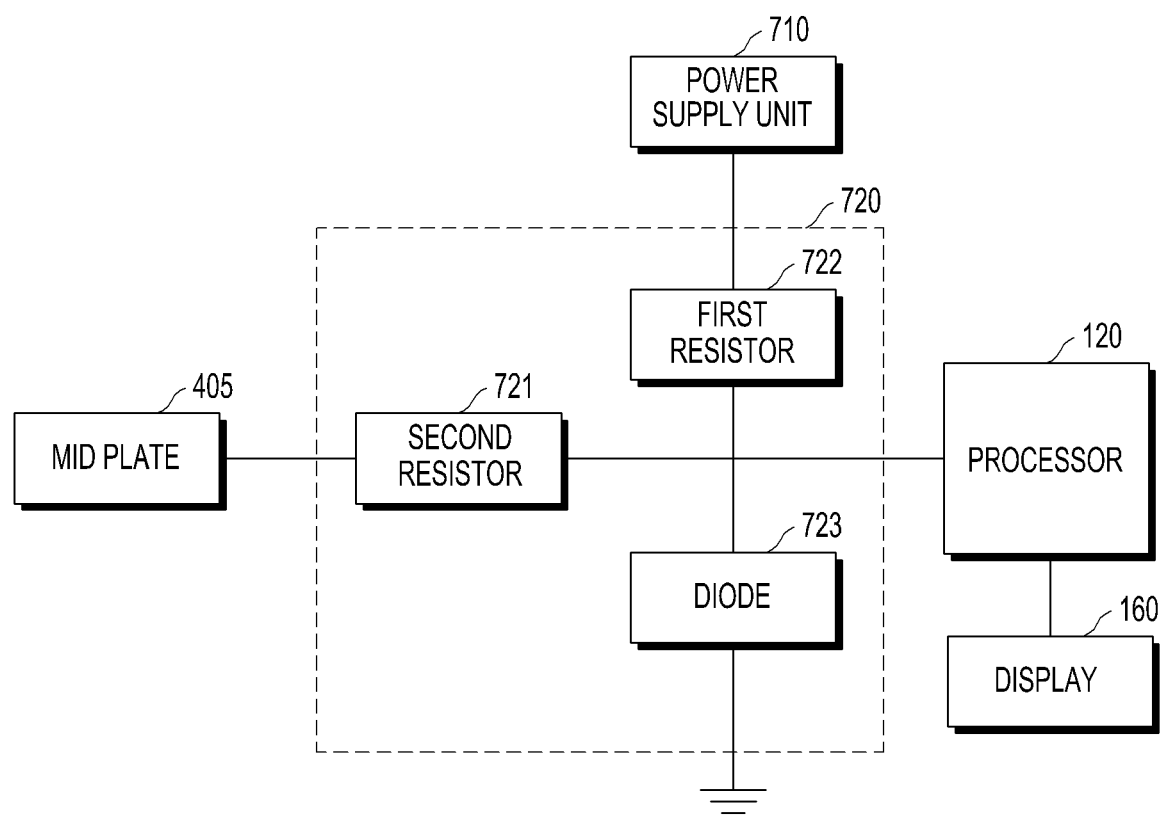
FIG. 7A is a block diagram of an electronic device that recognizes an accessory according to various embodiments of the present disclosure.
Figure 7B:
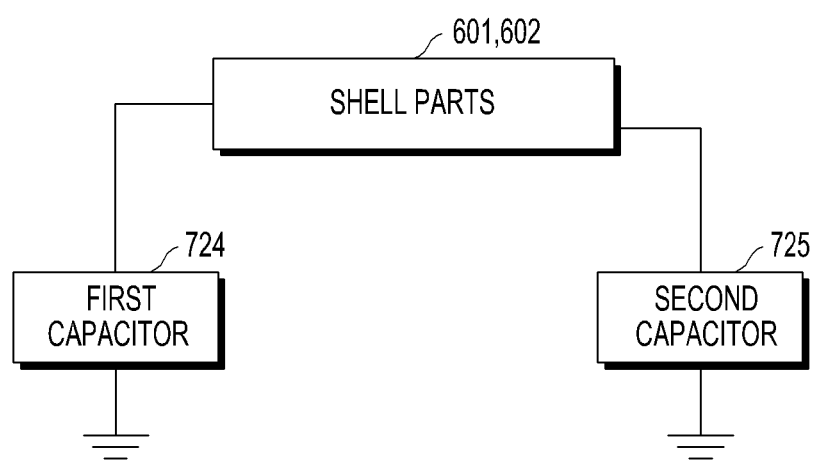
FIG. 7B is a view showing a structure in which capacitors are connected to outer metal parts of a connector of an electronic device according to various embodiments of the present disclosure.

FIG. 7A is a block diagram of an electronic device that recognizes an accessory according to various embodiments of the present disclosure, and FIG. 7B is a view showing a structure in which capacitors are connected to outer metal parts (e.g., shell parts) of the connector of the electronic device according to various embodiments of the present disclosure.

Referring to FIGS. 7A and 7B, the electronic device 101 that recognizes an accessory may include a processor 120, a display 160, a power supply unit 710 (e.g., a power supply), a connector 410b, and a circuit unit 720 (e.g., a circuit device). The connector 410b includes a contact substrate 405, and a mid plate 406 is included in the contact substrate 405. The circuit unit 720 may include a first resistor 722 and a second resistor 721 for preventing a leakage current based on the power supplied from the accessory and for adjusting the current, and a diode 723 that is formed at one end of the power supply unit 710. In addition, a first capacitor 724 and a second capacitor 725 may be connected to both ends 601 and 602 (e.g., footprints) of the outer metal parts (e.g., the shell parts 601 and 602) that surround the connector 410b. Alternatively, the first and second capacitors 724 and 725 may be connected to a portion of the outer metal parts that surround the connector 410b. The first and second capacitors 724 and 725 may prevent leakage current based on the power supplied from the accessory, and may have capacitance so as to be short-circuited when overcurrent occurs. The capacitance of each capacitor may be variably controlled. The first and second resistors 722 and 721 may have resistances so as to prevent leakage current, and the resistance of each resistor may be variably controlled.

According to various embodiments, the connector 410b of the electronic device 101 may be shaped such that the terminal 650 of the first external electronic device 102 can be plugged into the same in either direction, and a contact substrate 405 may be formed in the connector 410b. A mid plate 406 is included in the contact substrate 405. The contact substrate 405 of the electronic device 101 may be formed inside the connector that is formed on the housing. Twelve pins may be configured on the upper surface and the lower surface of the contact substrate 405, respectively, and the twelve pins that are formed on one surface may be arranged in a mirrored configuration with respect to the twelve pins that are formed on the other surface. With this structure, the user can rotate the terminal 650 of the accessory by 180 degrees to then plug the same into the connector 410b of the electronic device 101. In addition, the first capacitor 724 is connected to the first end (e.g., a footprint) of the connector 410b, and the second capacitor 725 is connected to the second end (e.g., a footprint) of the connector 410b. By adopting the first capacitor 724 and the second capacitor 725 described above, when overcurrent is generated in the state in which foreign matter is inserted into the connector 410b of the electronic device 101, at least one of the first capacitor 724 or the second capacitor 725 may be short-circuited in order to thereby prevent heat generation of the electronic device 101.

According to various embodiments, the power supply unit 710 may supply power to a battery (not shown) that is disposed in the housing of the electronic device 101 under the control of the processor 120. The battery (not shown) may supply power to the electronic device 101. In addition, the power supply unit 710 may supply, to the electronic device 101, the power that is received from an external power source (not shown) through a wired cable that is connected to the connector 410b. The power supply unit 710 may apply power to the mid plate 406 of the contact substrate 405 through the circuit unit 720. Further, the power supply unit 710 may supply, to the electronic device 101, the power that is wirelessly received from an external power source by using wireless charging technology.

According to various embodiments, the processor 120 may apply a current (e.g., less than 1 A) to the contact substrate 405 (e.g., the mid plate 406) that is formed in the connector 410b. The processor 120 may apply a current (e.g., less than 1 A) to the mid plate 406 that is formed in the contact substrate 405 through the circuit unit 720. The mid plate 406 inside the contact substrate 405 is electrically conductive. In addition, the capacitors 724 and 725 may be connected to the outer metal parts (e.g., the shell parts 601 and 602) that surround the connector 410b. For example, the capacitors 724 and 725 may be connected to respective footprints of the outer metal parts. The present disclosure may prevent loss associated with the generation of heat by connecting passive elements, such as capacitors. In addition, a groove is formed at both ends of the contact substrate 405, into which a connection pin 820 of the accessory may be mounted while being electrically connected. Further, the processor 120 may detect whether or not the terminal 650 of the accessory is inserted into the connector 410b in response to the mounting of the connection pin 820. The processor 120 may detect that the connection pin 820 is connected to the contact substrate 405 that is formed in the connector 410b while power is applied to the mid plate 406 of the contact substrate 405. The processor 120 may apply a small current (e.g., 2 μA) to the mid plate 406. Under the application of such a current, when the connection pin 820 is not connected to the contact substrate 405, the voltage on the mid plate 406 of the contact substrate 405 increases or becomes high, and when the connection pin 820 is connected to the contact substrate 405, the voltage on the mid plate 406 of the contact substrate 405 decreases or becomes low.

According to various embodiments, the processor 120 may determine whether or not the connection pin 820 has been connected to the contact substrate 405, depending on whether the voltage value on the mid plate 406 of the contact substrate 405 is high or low. For example, if the voltage on the mid plate 406 of the contact substrate 405 is low, the processor 120 may determine that the connection pin 820 has been normally connected to the contact substrate 405. Furthermore, the processor 120 may determine whether or not foreign matter that interferes with the electrical connection is present in the connector 410b of the electronic device 101. For example, if the voltage on the mid plate 406 of the contact substrate 405 is high (or if the voltage applied on the mid plate 406 is increased), the processor 120 may determine that the connection pin 820 has not been connected to the mid plate 406 of the contact substrate 405, or may determine that there is foreign matter that interferes with the electrical connection in the connector 410b of the electronic device 101.

According to various embodiments, the processor 120 may determine whether the voltage on the mid plate 406 of the contact substrate 405 is low (or whether the voltage applied on the mid plate 406 is decreased). If the voltage on the mid plate 406 of the contact substrate 405 is low, the processor 120 may determine whether or not it is possible to communicate with the accessory through the first configuration channel (CC)-pin 610-5 or 620-5 in the connector 410b. If it is determined that it is possible to communicate with the accessory, the processor 120 may use the second CC-pin (different from the first CC-pin) for supplying power to the accessory recognition IC. The processor 120 may supply power to the accessory recognition IC through the second CC-pin (different from the first CC-pin). The processor 120 may communicate with the accessory through the first CC-pin (different from the second CC-pin). The electronic device 101 may identify the usage and purpose of the accessory through this process. If it is determined that it is impossible to communicate with the accessory, the processor 120 may output a request to the user for checking whether or not the terminal 650 of the accessory is properly mounted into the connector 410b of the electronic device 101. If it is determined that it is impossible to communicate with the accessory by using at least one of the first CC-pin or the second CC-pin, the processor 120 may display, on the display 160, a request for checking whether or not the terminal 650 of the accessory is properly mounted into the connector 410*b* of the electronic device 101. Such an output is intended to induce the user to check at least one of the insertion state of the accessory, foreign matter in the connector, breakage of the connector, or a request for attaching or removing the accessory.

According to various embodiments, if foreign matter is attached to the first CC-pin or the second CC-pin to then form a short-circuit state, it may be impossible to determine the accessory. In this case, the processor 120 may detect the insertion of the accessory by applying power to the mid plate 406 that is formed in the contact substrate 405 of the connector 410*b*. Then, the processor 120 may notify the user of the insertion of foreign matter and/or the damage to the CC-pins. As described above, when foreign matter is inserted into the CC-pins of the connector 410*b*, or when the CC-pins are damaged, the processor 120 may preferentially identify the insertion of the accessory by using the contact substrate 405.

According to various embodiments, if the voltage on the mid plate 406 is high, the processor 120 may display, on the display 160, a request for checking whether or not the terminal 650 of the accessory is properly mounted into the connector 410*b* of the electronic device 101.

According to various embodiments, the display 160 may display a request (e.g., a pop-up, a warning screen, an error message, or the like) for checking whether or not the terminal 650 of the accessory is properly mounted into the connector 410*b* of the electronic device 101. If it is determined that the voltage on the mid plate 406 is high or that it is impossible to establish communication between the electronic device 101 and the accessory by using the CC-pins, the processor 120 may create a connector checking request message and then display the created message on the display 160. Alternatively, the processor 120 may create a connector checking request message and then output the created message through the speaker 282.

An electronic device, according to various embodiments of the present disclosure, may include: a housing that includes a first surface that faces in the first direction and a second surface that faces in the second direction, opposite the first direction; a display that is disposed between the first surface and the second surface and is exposed through the first surface; a power supply unit that applies a voltage; and at least one processor that is electrically connected to the display, wherein: the housing includes a connector of USB type C; the connector includes a contact substrate that is electrically connected to the processor to detect the insertion of an accessory; and the power supply unit and the processor are electrically connected to a mid plate that is formed in the contact substrate, and wherein the processor is configured to determine whether or not the accessory is inserted by using the mid plate, and is configured to determine the insertion state of the accessory based on a portion of the voltage applied to the mid plate by the power supply unit.

According to an embodiment, the processor may be configured to output a checking request for at least one of damage to the connector or the insertion of foreign matter into the connector when the voltage on the mid plate is high after the insertion of the accessory has been detected.

According to an embodiment, the processor may be configured to determine whether or not it is possible to communicate with the accessory through a first configuration channel (CC)-pin of the contact substrate when the voltage on the mid plate is low after the insertion of the accessory has been detected.

According to an embodiment, the processor may be configured to apply power to the accessory through a second CC-pin of the contact substrate to identify the usage of the accessory if it is determined that it is possible to communicate with the accessory.

According to an embodiment, the processor may be configured to identify the usage of the accessory by using a VBUS-pin of the contact substrate if it is determined that the usage cannot be identified only by using the CC-pin because of an internal error of the accessory even though it is possible to communicate with the accessory.

According to an embodiment, the processor may be configured to output a connector checking request if it is determined that it is impossible to communicate with the accessory.

According to an embodiment, the processor may be configured to output the connector checking request on a display.

According to an embodiment, the connector checking request may include a request for checking at least one of the insertion state of the accessory, foreign matter in the connector, breakage of the connector, or a request for attaching or removing the accessory.

According to an embodiment, the mid plate may be formed in the contact substrate and capacitors may be connected to both ends of the outer metal part of the connector, respectively.

According to an embodiment, the electronic device may further include a circuit unit that includes: two capacitors that are formed at both ends of the outer metal part of the connector, respectively; two resistors that prevent a leakage current based on the power applied from the accessory and that adjust the current; and a single diode that is formed at the end of the power supply unit.

Figure 8:
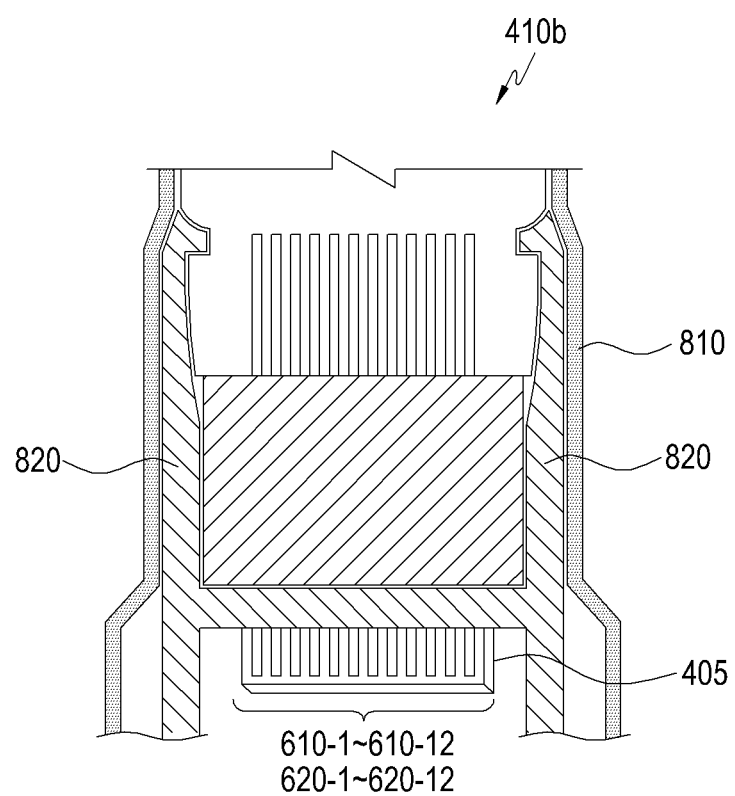
FIG. 8 is a side cross-sectional view of a receptacle and a plug in the state in which an accessory is mounted according to various embodiments of the present disclosure.

FIG. 8 is a side cross-sectional view of a connector to which an accessory is connected, according to various embodiments of the present disclosure.

Referring to FIG. 8, the accessory may adopt two connection pins 820 that have a grounding function so as to be electrically connected to the contact substrate 405 of the connector 410*b* of the electronic device 101. The electronic device 101 may detect whether or not the two connection pins 820 formed on the accessory are connected to the contact substrate 405. The electronic device 101 may apply power to the mid plate 406 that is formed in the contact substrate 405. The electronic device 101 may detect a voltage drop in response to the connection of the connection pins 820 of the accessory to the mid plate formed in the contact substrate 405 while applying power to the mid plate 406 formed in the contact substrate 405. As described above, when the voltage on the mid plate of the contact substrate drops, the electronic device 101 may determine that the accessory has been attached to the connector 410*b*. In addition, an outer metal part (e.g., a shell part 810) may be attached to the housing of the electronic device 101 so as to surround and protect the connector 410*b*, and may have an electrical grounding property. Further, twelve pins 610-1 to 610-12 are formed on the upper surface of the contact substrate 405 and twelve pins 620-1 to 620-12 are formed on the lower surface thereof. The pins formed on the contact substrate 405 may be electrically connected to the pins of the accessory, respectively, in response to the attachment of the accessory.

Figure 9:
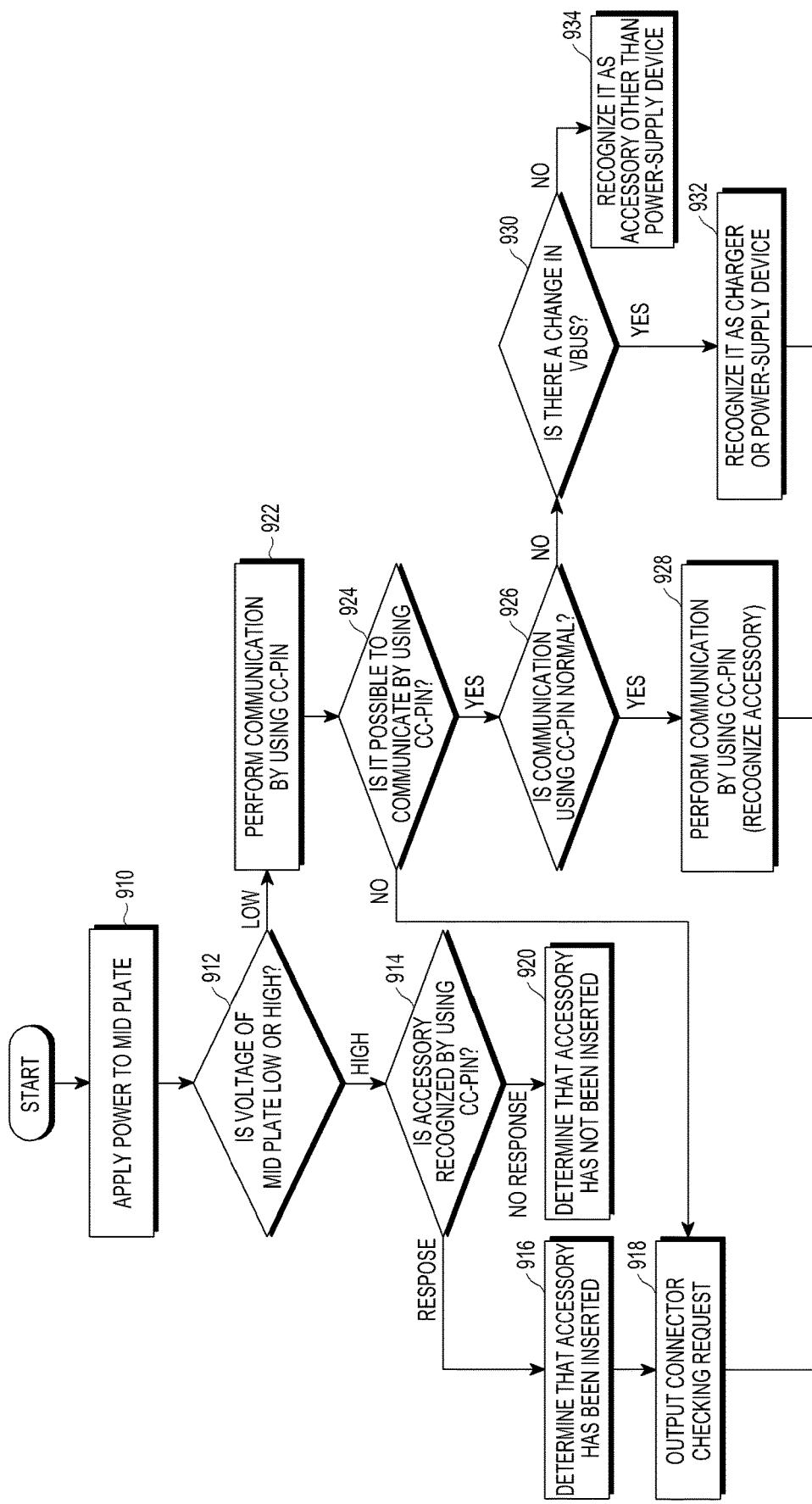
FIG. 9 is a flowchart showing an accessory recognition method of an electronic device according to various embodiments of the present disclosure.

FIG. 9 is a flowchart showing an accessory recognition method of an electronic device, according to various embodiments of the present disclosure.

Hereinafter, an accessory recognition method of an electronic device, according to various embodiments of the present disclosure, will be described in detail with reference to FIG. 9.

According to various embodiments, the electronic device 101 may apply power to the mid plate 406 that is formed in the connector 410*b* in operation 910. The electronic device 101 may apply power to the mid plate 406 that is formed in the contact substrate 405 in order to determine whether or not the connection pin of the accessory is connected to the contact substrate. The power may have a current value of less than a few microamperes.

According to various embodiments, the electronic device 101 may determine whether the voltage on the mid plate 406 is low or high in operation 912. The electronic device 101 may determine whether or not the connection pin of the accessory is connected to the contact substrate depending on whether the voltage on the mid plate 406 in the contact substrate 405 is low or high. For example, when the connection pin of the accessory is properly connected to the contact substrate, the voltage applied to the mid plate 406 becomes low, and when the connection pin is not connected or is improperly connected, the voltage on the mid plate 406 becomes high. If the connection pin 820 of the accessory is properly connected to the contact substrate 405, the current flowing through the mid plate 406 becomes low because it is grounded by the connection pin 820. If the connection pin 820 of the accessory is not connected to the contact substrate 405, or if there is foreign matter in the connector 410*b*, the current flowing through the same becomes high.

According to various embodiments, in operation 914, if the voltage on the mid plate is high, the electronic device 101 may determine whether or not an accessory is recognized by using the CC-pin. The electronic device 101 may transmit a signal to the CC-pin of the contact substrate 405 in order to thereby determine whether or not the accessory has been inserted.

According to various embodiments, the electronic device 101 may determine that an accessory has been inserted if a response is received from the accessory in operation 916. When a response to the transmitted signal is received from the accessory, the electronic device 101 may determine that the accessory has been inserted (or mounted) into the connector 410*b*.

According to various embodiments, the electronic device 101 may output a connector checking request in operation 918. If the voltage on the mid plate is high and if it is determined that the accessory has been inserted by using the CC-pin, the electronic device 101 may output a connector checking request. This output is intended to prompt the user to check at least one of the insertion state of the accessory, the presence of foreign matter in the connector, breakage of the connector, or a request for attaching or removing the accessory. Alternatively, the electronic device 101 may create a connector checking request message, and may output the created message through the speaker 282.

According to various embodiments, if a response is not received from the accessory, the electronic device 101 may determine that the accessory has not been inserted in operation 920.

According to various embodiments, the electronic device 101 may determine whether or not it is possible to communicate with the accessory by using the CC-pin in operation 922 and operation 924. The electronic device 101 may determine execution of communication with the accessory by using the CC-pin. If it is determined that the voltage on the mid plate 406 of the contact substrate 405 is low, the electronic device 101 may determine communication with the accessory by using the CC-pin, and may determine whether or not it is possible to communicate with the accessory. For example, if the CC1-pin 610-5 of the electronic device 101 is connected to the CC-pin 630-5 of the accessory by plugging the terminal 650 of the accessory into the connector 410*b* of the electronic device 101 while the upper surface of the terminal 650 faces upward, the electronic device 101 may use the CC2-pin 620-5 to supply power to the accessory recognition IC (VCONN). In addition, if the CC1-pin 610-5 of the electronic device 101 is connected to the CC-pin 640-5 of the accessory by plugging the terminal 650 of the accessory into the connector 410*b* of the electronic device 101 while the upper surface of the terminal 650 faces downward, the electronic device 101 may use the CC2-pin 620-5 to supply power to the accessory recognition IC (VCONN). Further, if the voltage on the mid plate is low and if it is impossible to communicate with the accessory by using the CC-pin, the electronic device 101 may output a connector checking request.

According to various embodiments, if it is impossible to communicate by using the CC-pin, the electronic device 101 may output a connector checking request in operation 918. If it is determined that it is impossible to communicate with the accessory by using the CC-pin, the electronic device 101 may output a connector checking request. This output is intended to induce the user to check at least one of the insertion state of the accessory, the presence of foreign matter in the connector, breakage of the connector, or a request for attaching or removing the accessory. Alternatively, the electronic device 101 may create a connector checking request message, and may output the created message through the speaker 282.

According to various embodiments, if it is possible to communicate using the CC-pin, the electronic device 101 may determine whether or not the communication using the CC-pin is normal in operation 926. The electronic device 101 may determine whether or not the communication using the CC-pin is normal by transmitting a signal to the CC-pin and by receiving a response to the transmitted signal from the accessory.

According to various embodiments, the electronic device 101 may perform communication by using the CC-pin in operation 928. The electronic device 101 may recognize the accessory by performing communication using the CC-pin. When the CC1-pin 610-5 of the electronic device 101 is connected to the CC-pin 630-5 of the accessory by plugging the terminal 650 of the accessory into the connector 410*b* of the electronic device 101 while the upper surface of the terminal 650 faces upward, the electronic device 101 may supply power for the accessory recognition IC via the CC2-pin 620-5, and may perform communication with the accessory in order to thereby recognize the accessory. In addition, when the CC1-pin 610-5 of the electronic device 101 is connected to the CC-pin 640-5 of the accessory by plugging the terminal 650 of the accessory into the connector 410*b* of the electronic device 101 while the upper surface of the terminal 650 faces downward, the electronic device 101 may supply power for the accessory recognition IC by using the CC2-pin 620-5, and may perform communication with the accessory in order to thereby recognize the accessory.

According to various embodiments, if it is determined that the communication using the CC-pin is not normal, the electronic device 101 may determine whether or not there is a change in VBUS in operation 930. The electronic device 101 may detect a change in VBUS in order to determine whether the accessory is a charger or a power-supply device. Alternatively, the electronic device 101 may detect a change in VBUS in order to recognize whether the accessory that has been inserted into the connector is another accessory other than the power-supply device.

According to various embodiments, if it is determined that there is a change in VBUS, the electronic device 101 may determine that the accessory that has been inserted into the connector 410*b* of the electronic device 101 is a charger or a power-supply device in operation 932.

According to various embodiments, if it is determined that there is no change in VBUS, the electronic device 101 may determine that another accessory other than the power-supply device has been inserted into the connector 410*b* of the electronic device 101 in operation 934.

One or more functions or operations in FIG. 9 described above may be omitted depending on the embodiment.

A method for recognizing an accessory of an electronic device, according to various embodiments of the present disclosure, may include: applying power to a mid plate in a connector that is formed on a housing of the electronic device; detecting the insertion of an accessory into the connector; determining whether the accessory is inserted by using the mid plate that is formed in a contact substrate in the connector; and determining the insertion state of the accessory based on a portion of the voltage applied to the mid plate.

According to an embodiment, the present disclosure may further include outputting a request for checking at least one of damage to the connector or the insertion of foreign matter into the connector when the voltage on the mid plate increases or is high after the insertion of the accessory has been detected.

According to an embodiment, the present disclosure may further include determining whether or not it is possible to communicate with the accessory through a first CC-pin of the contact substrate when the voltage on the mid plate decreases or is low after the insertion of the accessory has been detected.

According to an embodiment, the present disclosure may further include identifying the usage of the accessory by using a VBUS-pin of the contact substrate when the accessory cannot be recognized through normal communication because of an error in the accessory even though it is possible to communicate with the accessory.

According to an embodiment, the present disclosure may further include outputting the connector checking request if it is determined that it is impossible to communicate with the accessory.

According to an embodiment, the present disclosure may further include checking a change in the voltage of VBUS in the case where communication is not normal due to an error in the accessory.

According to an embodiment, the present disclosure may further include outputting the connector checking request on a display.

According to an embodiment of the present disclosure, the connector checking request may include a request for checking at least one of the insertion state of the accessory, the presence of foreign matter in the connector, breakage of the connector, or a request for attaching or removing the accessory.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by control circuits, the control circuits may perform a function corresponding to the command. The computer-readable storage medium may, for example, be the memory 130. At least some of the programming modules may be implemented (for example, executed) by, for example, the processor. At least some of the programming modules may include, for example, a module, a program, a routine, a set of instructions or a process for performing one or more functions.

The computer readable recoding medium includes magnetic media such include magnetic media, such as a hard disk, a floppy disk and a magnetic tape, optical media, such as a compact disc-ROM (CD-ROM) and a DVD, magneto-optical media, such as a floptical disk, and a hardware device specially configured to store and execute a program command, such as a ROM, a RAM and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. According to various embodiments, a computer-readable storage medium may store instructions that include: a first set of instructions for applying power to a mid plate in a connector that is formed on a housing of the electronic device; a second set of instructions for detecting the insertion of an accessory into the connector; a third set of instructions for determining whether or not the accessory is inserted by using the mid plate that is formed in a contact substrate in the connector; and a fourth set of instructions for determining the insertion state of the accessory based on a portion of the voltage applied to the mid plate.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a housing comprising a first surface facing a first direction and a second surface facing a second direction opposite to the first direction;
 a display disposed between the first surface and the second surface, the display being exposed through the first surface;
 at least one processor electrically connected to the display;
 a metal part surrounding a connector of universal serial bus (USB) type C; and
 a circuit comprising a first capacitor and a second capacitor, the first capacitor being connected to a first portion of the metal part surrounding the connector of USB type C, the second capacitor being connected to a second portion of the metal part surrounding the connector of USB type C, the first capacitor and the second capacitor being configured to prevent leakage current based on power applied from an accessory,
 wherein the first capacitor and the second capacitor are further configured to be short-circuited in response to an overcurrent occurrence.

2. The electronic device of claim 1, wherein the first capacitor and the second capacitor are connected to both ends, respectively, of the metal part surrounding the connector.

3. The electronic device of claim 1, wherein the first portion is a first end of the metal part and the second portion is a second end of the metal part.

4. The electronic device of claim 1, wherein the at least one processor is further configured to identify whether foreign matter exists in the connector.

5. The electronic device of claim 4, wherein the at least one processor is further configured to, in response to identifying that foreign matter exists in the connector, control the display to display a warning screen to induce a user to check for the foreign matter in the connector.

6. The electronic device of claim 5, wherein the warning screen comprises:
 a request for the user to check at least one of an insertion state of the accessory, whether the foreign matter exists in the connector, or whether the connector is broken, or
 a request for attaching or removing the accessory.

7. The electronic device of claim 1, further comprising:
 a power supply,
 wherein the circuit further comprises:
  two resistors configured to:
   prevent leakage current based on power applied from the accessory; and
   adjust current, and
  a single diode formed at an end of the power supply.

8. The electronic device of claim 7,
 wherein the connector comprises a contact substrate electrically connected to the at least one processor to detect an insertion of the accessory, and
 wherein the at least one processor is further configured to:
  identify whether the accessory is inserted using a mid plate of the contact substrate of the connector; and
  identify an insertion state of the accessory based on a portion of a voltage applied to the mid plate by the power supply.

9. The electronic device of claim 8,
 wherein the mid plate comprises an electrically conductive mid plate, and
 wherein the power supply and the at least one processor are electrically connected to the mid plate formed in the contact substrate.

10. The electronic device of claim 8, wherein the at least one processor is further configured to, in response to the voltage being applied to the mid plate decreasing after the insertion of the accessory has been detected, identify whether it is possible to communicate with the accessory through a first configuration channel (CC)-pin of the contact substrate.

11. An electronic device comprising:
 a housing comprising a first surface facing a first direction and a second surface facing a second direction opposite to the first direction;
 a display disposed between the first surface and the second surface, the display being exposed through the first surface;
 at least one processor electrically connected to the display;
 a metal part surrounding a connector of universal serial bus (USB) type C; and
 a circuit comprising a first capacitor and a second capacitor, the first capacitor being connected to a first portion of the metal part surrounding the connector of USB type C, the second capacitor being connected to a second portion of the metal part surrounding the connector of USB type C, the first capacitor and the second capacitor being configured to prevent leakage current based on power applied from an accessory,
 wherein the at least one processor is configured to:
  identify whether foreign matter exists in the connector, and
  in response to identifying that the foreign matter exists in the connector, control the display to display a warning screen to induce a user to check for the foreign matter in the connector.

12. The electronic device of claim 11, wherein the first capacitor and the second capacitor are further configured to be short-circuited in response to an overcurrent occurrence.

13. The electronic device of claim 12, wherein the first capacitor and the second capacitor are connected to both ends, respectively, of the metal part surrounding the connector.

14. The electronic device of claim 12, wherein the first portion is a first end of the metal part and the second portion is a second end of the metal part.

15. The electronic device of claim 11, wherein the warning screen comprises at least one of a request for the user to check an insertion state of the accessory, a request for the user to check whether the foreign matter is in the connector, a request for the user to check whether the connector is broken, or a request for the user to attach or remove the accessory.

16. The electronic device of claim 11, further comprising:
 a power supply,
 wherein the circuit further comprises:
  two resistors configured to:
   prevent leakage current based on power applied from the accessory; and
   adjust current, and
  a single diode formed at an end of the power supply.

17. The electronic device of claim 16,
 wherein the connector comprises a contact substrate electrically connected to the at least one processor to detect an insertion of the accessory, and
 wherein the at least one processor is further configured to:

determine whether the accessory is inserted using a mid plate of the contact substrate of the connector; and
determine an insertion state of the accessory based on a portion of a voltage applied to the mid plate by the power supply.

18. The electronic device of claim 17,
wherein the mid plate comprises an electrically conductive mid plate, and
wherein the power supply and the at least one processor are electrically connected to the mid plate formed in the contact substrate.

19. The electronic device of claim 17, wherein the at least one processor is further configured to, in response to the voltage being applied to the mid plate decreasing after the insertion of the accessory has been detected, identify whether it is possible to communicate with the accessory through a first configuration channel (CC)-pin of the contact substrate.

20. A device comprising:
a housing;
a display exposed through a surface of the housing;
at least one processor electrically connected to the display;
a metal part surrounding a connector of universal serial bus (USB) type C; and
a circuit comprising a first capacitor and a second capacitor, the first capacitor being connected to a first portion of the metal part surrounding the connector of USB type C, the second capacitor being connected to a second portion of the metal part surrounding the connector of USB type C, the first capacitor and the second capacitor being configured to prevent leakage current based on power applied from an accessory,
wherein the first capacitor and the second capacitor are configured to be short-circuited in response to an overcurrent occurrence.

21. The electronic device of claim 3, wherein the first end of the metal part surrounding the connector of USB type C is an opposite end to the second end of the metal part surrounding the connector of USB type C.

* * * * *